United States Patent [19]

Roefaro

[11] 3,955,234

[45] May 11, 1976

[54] TOOL FOR DRESSING MEAT

[76] Inventor: Thomas A. Roefaro, 2321 Saunder Station Road, Monroeville, Pa. 15146

[22] Filed: Oct. 16, 1974

[21] Appl. No.: 515,181

[52] U.S. Cl. ................................. 15/236 R; 17/19; 30/172
[51] Int. Cl.² ..................... A22B 5/08; A22C 17/00
[58] Field of Search ................. 15/223, 224, 236 R, 15/245, 104 S, 117; 17/19, 66; 30/171, 172, 353; 128/54, 67, 304; D7/183, 184, 185; 119/83, 86, 90

[56] References Cited
UNITED STATES PATENTS

| 269,793 | 12/1882 | Keene | 119/90 |
|---|---|---|---|
| 353,863 | 12/1886 | Kaelin | 15/245 |
| 499,060 | 6/1893 | Unsinger | 15/236 R UX |
| 562,072 | 6/1896 | Dunham | 15/245 |
| 1,405,457 | 2/1922 | Stewart | 17/19 |
| 1,878,689 | 9/1932 | Flack | 15/236 R UX |
| 2,048,792 | 7/1936 | Hendey | 15/245 |
| 2,437,316 | 3/1948 | Gambino et al. | 15/236 R |
| 3,699,604 | 10/1972 | Hunt | 15/236 R |

FOREIGN PATENTS OR APPLICATIONS

| 176,551 | 4/1935 | Switzerland | 119/86 |
|---|---|---|---|

*Primary Examiner*—Daniel Blum
*Attorney, Agent, or Firm*—Donald S. Ferito

[57] ABSTRACT

Tool comprises an elongated handle having a bifurcated extension projecting from one end and at least one elongated blade member affixed to and spanning said bifurcated extension substantially perpendicular to the longitudinal axis thereof. The blade member extends laterally beyond the branches of the bifurcated extension and constitutes working edges of the blade. The two opposed longitudinal outer edges of the blade member project from opposite sides of the bifurcated extension and constitute additional working edges of the blade. The tool is utilized by grasping the handle and passing the working edge of the blade over the surfaces of cut meat slices or pieces to remove bone dust, loose fat particles, etc., therefrom.

2 Claims, 5 Drawing Figures

TOOL FOR DRESSING MEAT

The present invention relates generally to food processing equipment and more particularly to a tool for dressing meat and is an improvement over the tool for dressing meat disclosed by my U.S. Pat. No. 3,516,106. In addition to the patents cited during the prosecution of the application from which U.S. Pat. No. 3,516,106 issued, of which I am aware, which relate to tools for dressing meat, or similar devices, are the following:

| Patent No. | Patentee |
| --- | --- |
| 2,484,267 | Bower |
| 2,594,174 | Johnson |
| 2,980,937 | Defries |
| 3,699,604 | Hunt |
| 2,449,092 | Struble |
| 2,583,750 | Runnels |

It is the primary object of my invention to provide an improved tool for dressing meat which tool is of inexpensive and simple structure which can be efficiently and easily utilized to dress and clean surfaces of cut fresh meat of residual bone, fats and loose meat particles after cutting or sawing.

Another object of my invention is to provide a meat dressing tool as set forth by the above statement of object which is sufficiently flexible so as to clean the entire surface of a meat cut including areas thereof closely contiguous to a bone.

It is a more specialized object of my invention to provide a tool of the character set forth by the above statements of object which essentially includes an elongated handle having a bifurcated extension projecting from one end and at least one elongated blade member of resilient plastic material affixed to and spanning said bifurcated extension substantially perpendicular to the longitudinal axis thereof; the terminal ends of the blade membet extending laterally beyond the branches of the bifurcated extension and constituting working edges of the blade; the blade member also having two opposed longitudinal edges extending therealong between its terminal ends and constituting additional working edges of the blade; the end and longitudinal working edges of the blade being adapted to be applied to a surface of cut meat to scrape and dress the same.

The above and other objects will become more apparent after referring to the specification and attached drawing in which.

Figure 1:
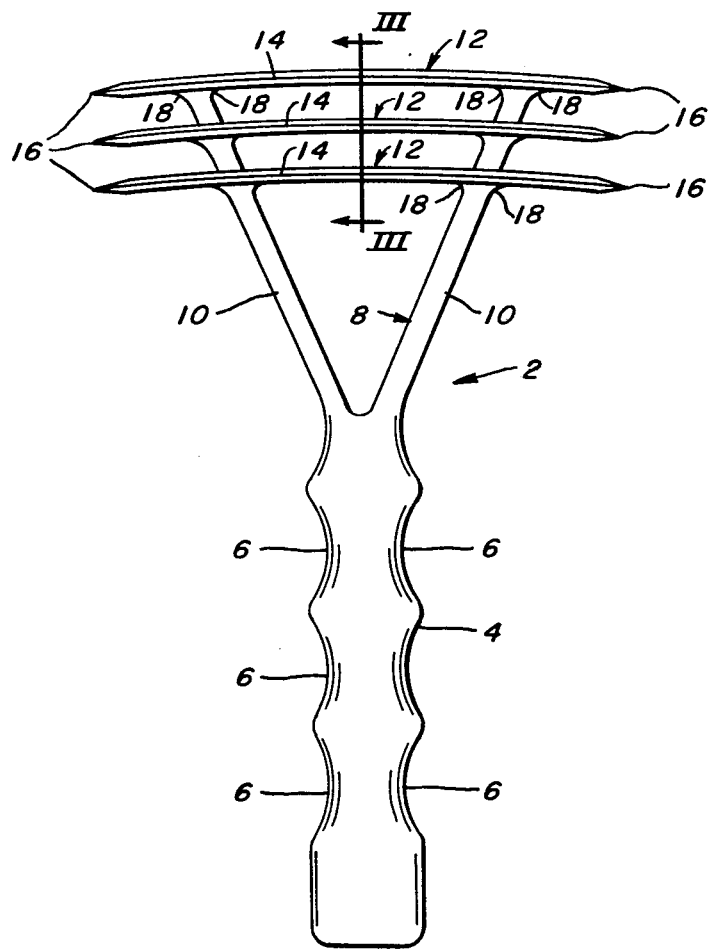
FIG. 1 is a front elevational view of the tool of the invention.
Figure 2:
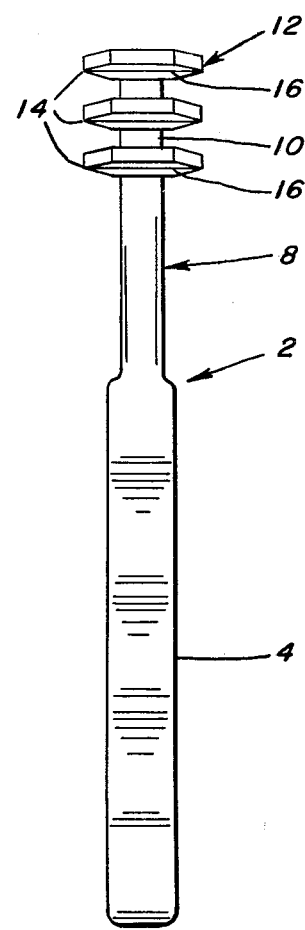
FIG. 2 is a side elevational view looking at the right side of FIG. 1.

Referring more particularly to the drawing, reference character 2 designates generally the integral meat dressing tool of the invention which includes an elongated handle 4, preferably composed of a substantially inexpensive stiff material such as hard plastic or the like. As best shown in FIG. 1, the handle 4 is formed with opposed finger-gripping notches 6 along two sides of its length.

Reference numeral 8 designates a bifurcated extension, which may be made of a flexible plastic material projecting from one end of the handle 4. The extension 8 is a substantially V shape integral with the handle 4 and positioned with the apex of the V shape substantially co-axial with the handle 4. The two branches 10 of the extension 8 are substantially uniform in length and may be of reduced cross-sectional area relative to the main body of the handle 4.

Figure 3:
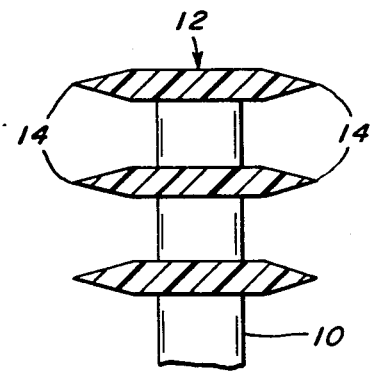
FIG. 3 is a cross-sectional view taken substantially along the line III—III of FIG. 1.
Figure 4:
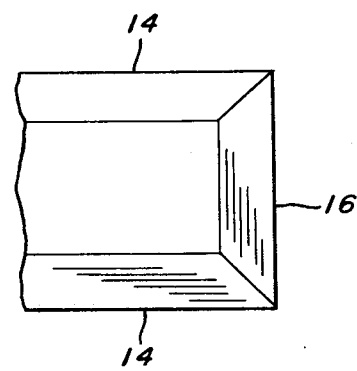
FIG. 4 is an enlarged partial top plan view of one of the blade members of the invention showing the terminal end thereof and a portion of the blade adjacent to the terminal end.
Figure 5:
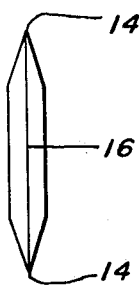
FIG. 5 is an end view looking at the right end of FIG. 4.

Three blade members 12 made of resilient plastic or similar material are disposed in spaced tier fashion in the extension 8 with their outer longitudinal edges extending substantially normal to the longitudinal axis of the extension and the terminal ends thereof projecting laterally beyond the branches 10 of the extension 8, as best shown in FIG. 1. As shown in FIGS. 1 and 3, the blade members are of elongated sexangular cross-section and of uniform width. It will be understood that the number of blade members may vary from one or a plurality of more than one, as desired. The blade members are slightly convex along their lengths and are disposed substantially parallel with each other.

The outer longitudinal edges 14 and terminal edges 16 of the blade members 12 constitute the working portions of the blade members which are utilized to scrape the surfaces of cut pieces of fresh meat to dress the meat cuts by cleaning bone residue, fat particles, loose meat, etc., therefrom. The terminal working edges 16 of the blade members are especially adapted for cleaning narrow surfaces of cut meat, narrow areas of meat surfaces of cut meat, narrow areas of meat surfaces between bones, or areas of the meat surface contiguous to bones. The longitudinal working edges of the blade members which project laterally from the branches of the bifurcated extension 8 are also especially adapted to dress areas of the meat surface contiguous to bones.

The branches 10 of the bifurcated extension 8 not only serve to support the blade members 12 but also provide support along the lengths of the blade members so that the longitudinal edges of the blade members, particularly those projecting laterally beyond the branches 10 of the extension 8, are stabilized.

If desired, fillets 18 may be provided between the branches 10 and the undersides of the blade members 12, as best shown in FIG. 1, to provide further stability to the tool structure.

Although the blade members 12 shown in FIGS. 1 and 3 are illustrated with similar tapered working edges, it will be understood that working edges of different shapes can be provided on opposite sides of the blade members. The working edges of the blade members can be tapered, as shown in FIGS. 1 and 3, or they may be shaped otherwise as desired. For example, they may be square cut or the tapered working edges may be formed by a maximum thickness at the outer edges of the blade which tapers to a minimum thickness intermediate with the width of the blade.

In operation, to dress a piece of cut meat with the tool of the invention, the handle 4 is grasped by the butcher and the outer working edge portions 14 of the blade members 12 are applied to the meat surface to be dressed and drawn lightly therealong. Depending upon the size of the meat surface or area of the meat surface to be dressed, the tool is used with the longitudinal working edges 14 or the terminal end working edges 16 in contact with the meat surface.

As the tool of the invention is utilized, particles of bone residue, fat, loose meat, etc., will accumulate on the working edges of the blades thereof. These accumulations may be easily removed by wiping the outer working edges of the blade members with disposable paper toweling or similar material or by immersing the tool or blade portion thereof in water. The tool can be sterilized by boiling it in water for a time.

Another important advantage inherent in the tool of my invention is that use thereof in the manner described above will not cause damage to the tissue of the meat surfaces being dressed because the working edges 14 and 16 of the blade members will yield before they can tear any of the meat tissue since they are made of flexible, resilient plastic or similar material.

Although I have shown and described but one embodiment of my invention it will be understood that other embodiments may be made without departure from the spirit and scope of the claims hereinafter set forth and that the specification and drawing are to be considered as merely illustrative rather than limiting.

I claim:

1. A one piece tool for dressing meat comprising an elongated plastic handle portion, said handle portion being formed with an integral resilient plastic bifurcated extension at one end, each branch of said bifurcated extension being of substantially uniform cross-sectional area less than that of the main unbifurcated body of said handle, at least one elongated blade member of resilient plastic integral with and spanning said bifurcated extension portion of said handle substantially perpendicular to the longitudinal axis thereof, the terminal ends of said blade member being disposed to extend laterally beyond the branches of said bifurcated extension portion, said terminal ends being tapered to a line along their transverse edges whereby to form working edges on said blade adapted to be applied to a substantially flat surface of cut meat to scrape and dress the same, said blade member being integral in structure and having a elongated sexangular cross-section of substantially uniform width along its length, the two opposed outer longitudinal edges of said blade each being tapered to a line along their lengths whereby to form working edges on said blade adapted to be applied to a substantially flat surface of cut meat to scrape and dress the same.

2. A tool as defined by claim 1 in which said blade member is slightly convex along its length.

* * * * *